US012353161B2

United States Patent
Yamahori et al.

(10) Patent No.: US 12,353,161 B2
(45) Date of Patent: Jul. 8, 2025

(54) IMAGE FORMING APPARATUS, FAULT SENSING METHOD, AND NON-TRANSITORY COMPUTER-READABLE RECORDING MEDIUM STORING FAULT SENSING PROGRAM

(71) Applicants: Shunta Yamahori, Kanagawa (JP); Yuuji Matsuda, Tokyo (JP); Yuji Ieiri, Kanagawa (JP); Hiroshi Okamura, Kanagawa (JP); Tomohide Kondoh, Kanagawa (JP)

(72) Inventors: Shunta Yamahori, Kanagawa (JP); Yuuji Matsuda, Tokyo (JP); Yuji Ieiri, Kanagawa (JP); Hiroshi Okamura, Kanagawa (JP); Tomohide Kondoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/632,723

(22) Filed: Apr. 11, 2024

(65) Prior Publication Data

US 2024/0377784 A1 Nov. 14, 2024

(30) Foreign Application Priority Data

May 10, 2023 (JP) .................................. 2023-077817

(51) Int. Cl.
*G03G 15/00* (2006.01)
*G03G 15/08* (2006.01)
(Continued)

(52) U.S. Cl.
CPC ..... *G03G 21/1633* (2013.01); *G03G 15/0867* (2013.01); *G03G 15/55* (2013.01);
(Continued)

(58) Field of Classification Search
CPC ........... G03G 15/0867; G03G 15/0886; G03G 15/55; G03G 21/1633; G03G 21/1647; G03G 21/1654; G06F 1/3231; G06F 3/121
See application file for complete search history.

(56) References Cited

U.S. PATENT DOCUMENTS

2010/0329704 A1 12/2010 Tachibana
2011/0058825 A1* 3/2011 Tsukijima .......... G03G 21/1633
399/258
(Continued)

FOREIGN PATENT DOCUMENTS

JP 5414386 2/2014
JP 2020-190694 11/2020
JP 2024-006298 1/2024

OTHER PUBLICATIONS

U.S. Appl. No. 18/433,675, filed Feb. 6, 2024, Tomohide Kondoh.

*Primary Examiner* — Sophia S Chen
(74) *Attorney, Agent, or Firm* — IPUSA, PLLC

(57) ABSTRACT

To inhibit toner bottle in which toner is remaining from being replaceable, image forming apparatus includes: bottle cover that can open/close insertion opening of toner bottle housing; locking mechanism to lock closed bottle cover; actuating mechanism including unlocking member to unlock locked bottle cover and open bottle cover, and actuator to actuate unlocking member; front cover situated in openable/closable manner in front of bottle cover to inhibit bottle cover from becoming open while front cover is closed; fault sensing unit to perform first fault sensing process in which actuator is sensed as having fault when failing to actuate unlocking member in spite of actuator being driven while image forming unit is non-operating; and condition sensing unit to sense presence of possibility that front cover is opened. Fault sensing unit is excluded from performing first (Continued)

fault sensing process while condition sensing unit is sensing the possibility as being present.

17 Claims, 9 Drawing Sheets

(51) Int. Cl.
    *G03G 21/16*     (2006.01)
    *G06F 1/3231*     (2019.01)

(52) U.S. Cl.
    CPC ....... *G03G 21/1647* (2013.01); *G06F 1/3231* (2013.01); *G03G 2221/1654* (2013.01)

(56) References Cited

U.S. PATENT DOCUMENTS

| | | | |
|---|---|---|---|
| 2019/0187941 A1* | 6/2019 | Takiguchi | G06F 1/3231 |
| 2019/0369956 A1* | 12/2019 | Sakai | G06F 3/121 |
| 2020/0201229 A1 | 6/2020 | Ieiri | |
| 2020/0233361 A1 | 7/2020 | Hara et al. | |
| 2020/0301357 A1 | 9/2020 | Hommi et al. | |
| 2020/0333725 A1 | 10/2020 | Tomura et al. | |
| 2024/0004327 A1 | 1/2024 | Ieiri et al. | |
| 2024/0160125 A1* | 5/2024 | Suzuki | G03G 15/0886 |
| 2024/0171690 A1* | 5/2024 | Kaneda | G03G 21/1633 |

\* cited by examiner

FIG.7

| STATE OF IMAGE FORMING UNIT | STATE OF FRONT COVER | WHETHER HUMAN IS PRESENT IN FRONT OF APPARATUS | FAULT SENSING FOR ON CONTROL PERIOD OF SOLENOID | FAULT SENSING FOR OFF CONTROL PERIOD OF SOLENOID |
|---|---|---|---|---|
| NOT PERFORMING PRINTING | CLOSED | ABSENT | PERFORM | PERFORM |
| | OPEN | PRESENT | NOT PERFORM | |
| | | | NOT PERFORM | |
| PERFORMING PRINTING | | | PERFORM | PERFORM |

IMAGE FORMING APPARATUS, FAULT SENSING METHOD, AND NON-TRANSITORY COMPUTER-READABLE RECORDING MEDIUM STORING FAULT SENSING PROGRAM

CROSS-REFERENCE TO RELATED APPLICATION

The present application claims priority under 35 U.S.C. § 119 to Japanese Patent Application No. 2023-077817, filed May 10, 2023, the contents of which are incorporated herein by reference in their entirety.

BACKGROUND OF THE INVENTION

Field of the Invention

The present disclosure relates to an image forming apparatus, a fault sensing method, and a non-transitory computer-readable recording medium storing a fault sensing program.

Description of the Related Art

According to a technique of an image forming apparatus, a lockable bottle cover situated on an insertion opening of a toner bottle housing is allowed to unlock when the amount of a toner remaining in the toner bottle becomes zero, in order that toner bottle replacement in a state in which the toner is still remaining can be avoided. This type of an image forming apparatus includes a locking mechanism configured to lock the bottle cover on the insertion opening of the toner bottle housing, an unlocking mechanism configured to unlock the locked state, and a sensing mechanism configured to sense whether the bottle cover is open or closed. The locking mechanism controls unlocking by using a solenoid.

The image forming apparatus displays a message prompting the user to do a check on a display unit, in a case where the sensing mechanism indicates that the bottle cover remains closed even after being unlocked. In a case where the user replaced toner bottles after the message was displayed, the image forming apparatus determines that the sensing mechanism is having a fault. In a case where the user did not replace toner bottles, the image forming apparatus determines that the locking mechanism is having a fault (for example, see Japanese Unexamined Patent Application Publication No. 2020-190694).

SUMMARY OF THE INVENTION

An image forming apparatus according to an embodiment of the present disclosure includes: an image forming unit configured to form an image; a toner bottle housing configured to house a toner bottle in a withdrawably insertable manner, the toner bottle being filled with a toner used by the image forming unit to form an image; a bottle cover situated such that the bottle cover can open or close an insertion opening of the toner bottle housing; a locking mechanism configured to lock the bottle cover being in a closed state in which the bottle cover is at a position to cover the insertion opening; an actuating mechanism including an unlocking member and an actuator, the unlocking member being configured to unlock the bottle cover, being in a locked state, to bring the bottle cover into an open state in which the bottle cover does not cover the insertion opening, and the actuator being configured to actuate the unlocking member; a front cover situated in an openable/closable manner in front of the bottle cover and configured to inhibit the bottle cover from becoming open while the front cover is in a closed state; a fault sensing unit configured to perform a first fault sensing process in which the actuator is sensed as having a fault in a case where the actuator fails to actuate the unlocking member in spite of the actuator being driven while the image forming unit is non-operating; and a condition sensing unit configured to sense presence of a possibility that the front cover is going to be opened, wherein the fault sensing unit is excluded from performing the first fault sensing process while the condition sensing unit is sensing the possibility as being present.

BRIEF DESCRIPTION OF THE DRAWINGS

FIG. 7 is a diagram illustrating an example of a determining process according to which a condition sensing unit of FIG. 6 determines whether or not to perform fault sensing for an ON control period of a solenoid and for an OFF control period of the solenoid;

FIG. 8 is a flowchart illustrating an example of a process according to which the CPU of FIG. 6 senses a fault of the solenoid, a transistor, and the like.

DESCRIPTION OF THE EMBODIMENTS

Figure 1:
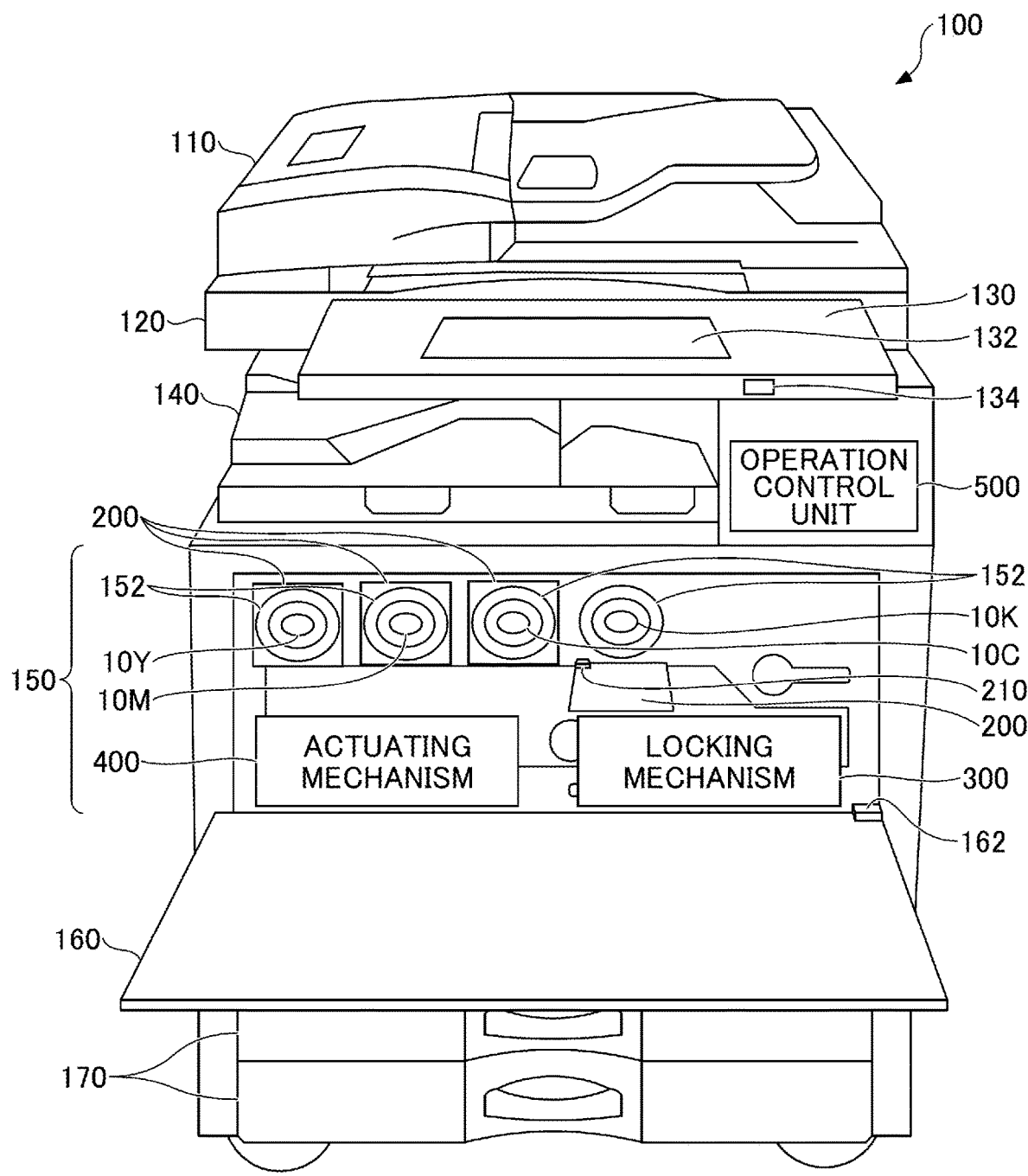
FIG. 1 is an overall configuration view illustrating an example of an image forming apparatus according to an embodiment of the present disclosure.

For example, in a case of determining whether a locking mechanism is having a fault or not by unlocking a bottle cover in an image forming apparatus in which the locking mechanism is not having a fault, unlocking the bottle cover while a front cover is opened may put a toner bottle in which a toner is remaining in a risky state of being replaceable, because the bottle cover becomes open as a result of being unlocked.

In view of the issue described above, an object of the present disclosure is to inhibit a toner bottle in which a toner is remaining from being put in a replaceable state.

According to an embodiment of the present disclosure, it is possible to inhibit a toner bottle in which a toner is remaining from being put in a replaceable state.

An embodiment will be described below with reference to the drawings. The same components in the drawings will be denoted by the same reference numerals, and overlapping descriptions of the same components may be omitted.

FIG. 1 is an overall configuration view illustrating an example of an image forming apparatus according to an embodiment of the present disclosure. For example, an image forming apparatus 100 is a Multifunction Peripheral (MFP/Printer/Product) including a copier function, a FAX function, a print function, a scanner function, and the like.

The image forming apparatus 100 may include a print function alone, or may include a print function together with any selected from a copier function, a FAX function, and a scanner function. An image to be processed by the image forming apparatus 100 may include not only image data including an image, but also text data free of an image.

The image forming apparatus 100 is a tandem-type electrophotographic image forming apparatus employing an intermediate transfer method. The image forming apparatus 100 includes an automatic document feeder 110, an image reader 120, an operation unit 130, a paper tray 140, an image forming unit 150, a front cover 160, and a paper feeding cassette 170. The image forming apparatus 100 also includes a locking mechanism 300, an actuating mechanism 400, and an operation control unit 500 configured to control the entire operation of the image forming apparatus 100. Practically, the operation control unit 500 is situated inside the body of the image forming apparatus 100 in the form of, for example, a control board.

The automatic document feeder 110 is configured to feed each single one of original document sheets separately into the image reader 120. The image reader 120 is configured to generate image data by optically reading image information of each one of the original document sheets sent sequentially from the automatic document feeder 110. The image reader 120 can also generate image data by optically reading an original document sheet placed on a transparent original document table.

The operation unit 130 includes an operation panel 132 configured to receive various inputs corresponding to operations of a user, and to display various information, and a human-presence sensor 134 configured to sense whether the user is present in front of the operation unit 130 or not.

Examples of information displayed on the operation panel 132 include information indicating an operation inputted and received, information indicating an operating status of the image forming apparatus 100, information indicating the state of settings in the image forming apparatus 100, and various alarms. Examples of various alarms include a "service call" display, which prompts asking a service hub of the image forming apparatus 100 for a repair in a case where the image forming apparatus 100 senses an abnormality of the internal mechanism.

For example, the operation panel 132 may include a Liquid Crystal Display (LCD) or an organic Electro-Luminescence (EL) display having a touch panel function. The operation panel 132 may further include hardware keys or the like in addition to the display having a touch panel function.

The human-presence sensor 134 is an infrared sensor, a camera, or the like. The human-presence sensor 134 is configured to sense whether the user is present in front of the image forming apparatus 100 or not. The human-presence sensor 134 outputs information indicating whether the user is present or not to the operation control unit 500.

The image forming apparatus 100 may include an illuminance sensor or a timer instead of the human-presence sensor 134. For example, the illuminance sensor is configured to output information indicating presence of a possibility that the user is present in front of the image forming apparatus 100 to the operation control unit 500 in a case where the environment in which the image forming apparatus 100 is installed (e.g., a room) is higher than or equal to a predetermined illuminance. The illuminance sensor outputs information indicating absence of the possibility that the user is present in front of the image forming apparatus 100 to the operation control unit 500 in a case where the installation environment is lower than the predetermined illuminance.

For example, the timer is configured to output information indicating presence of the possibility that the user is present in front of the image forming apparatus 100 to the operation control unit 500 at a previously set business start time. The timer outputs information indicating absence of the possibility that the user is present in front of the image forming apparatus 100 to the operation control unit 500 at a business end time. By performing a fault sensing process by controlling a solenoid 410 to be ON at a timing at which there is a low possibility of a human being present in front of the image forming apparatus 100 in accordance with the illuminance sensor or the timer, it is possible to perform fault sensing at a timing at which there is a low urgency for the recovery from a fault.

The image forming unit 150 includes a photoconductor drum, a charging device, a writing unit, a developing device, a conveying belt, a fixing device, and the like, which are non-illustrated. The image forming unit 150 is an example of an image forming unit. The charging device is configured to charge a circumferential surface of the photoconductor drum. The writing unit is configured to expose the charged photoconductor drum to light and write an electrostatic latent image on the photoconductor drum based on image data read by the image reader 120.

The developing device is configured to develop the latent image written on the photoconductor drum with a toner. The conveying belt is configured to convey a sheet of paper, on which a toner image is to be formed, to the photoconductor drum, such that the toner image attached on the photoconductor drum through developing is transferred to the sheet of paper. The fixing device is configured to fix the toner image over the sheet of paper onto the sheet of paper, to form the toner image on the sheet of paper. The sheet of paper on which the toner image is formed is ejected onto the paper tray 140.

The image forming unit 150 includes toner bottle housings 152 in which toner bottles 10Y, 10C, 10M, and 10K filled with, for example, yellow, cyan, magenta, and black toners respectively are housed. When describing the toner bottles 10Y, 10C, 10M, and 10K in the following description without distinguishing them, they may also be referred to as toner bottles 10.

The image forming unit 150 includes bottle covers 200 attached such that they can open or close insertion openings 152a (FIG. 3) of the toner bottle housings 152 through which the toner bottles 10 are inserted, and open/close sensors 210. The open/close sensors 210 are configured to sense whether the bottle covers 200 are open or closed.

Figure 3:
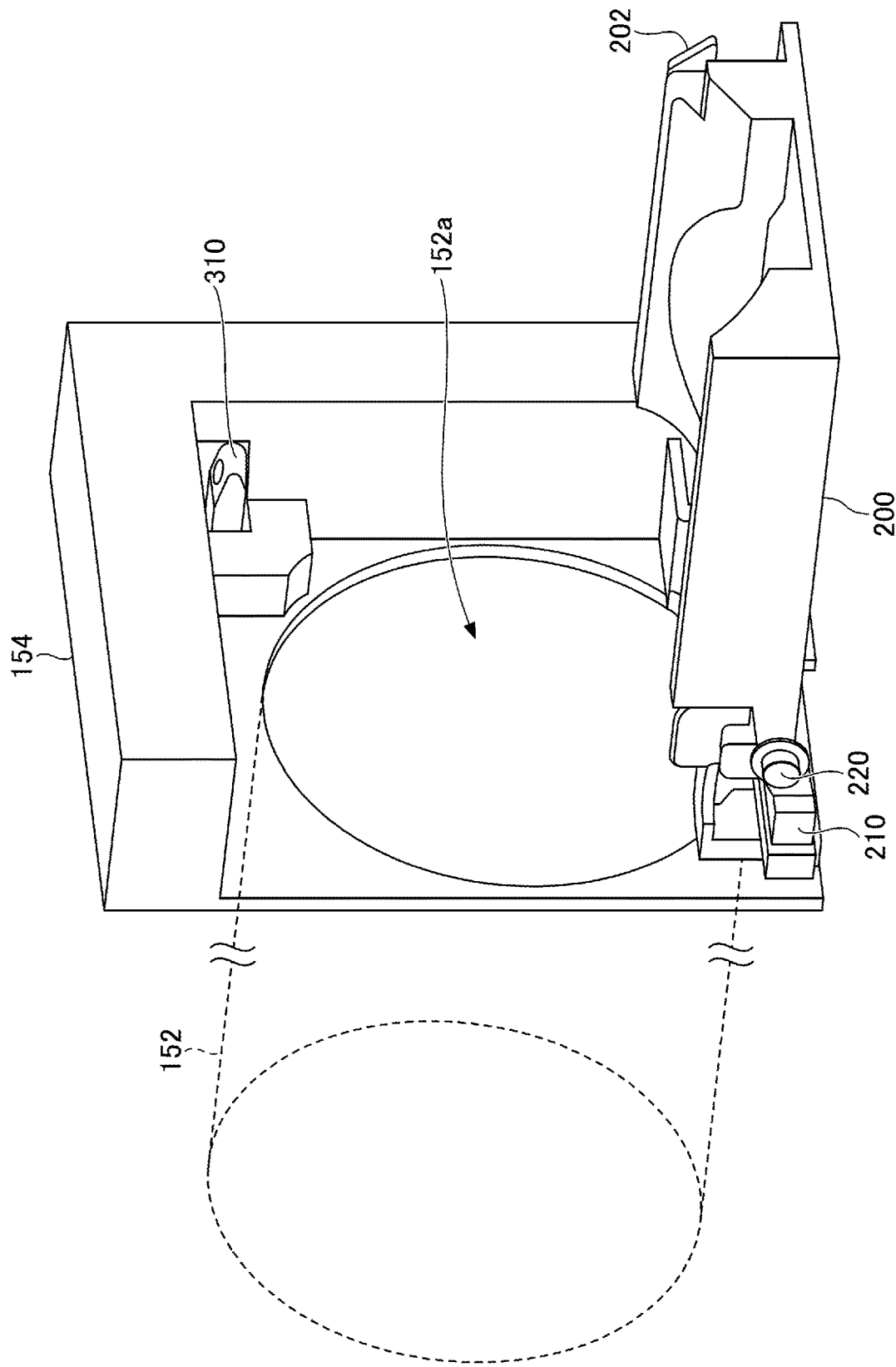
FIG. 3 is a partial oblique view illustrating an example of a bottle cover situated on a toner bottle housing of FIG. 1.
Figure 4:
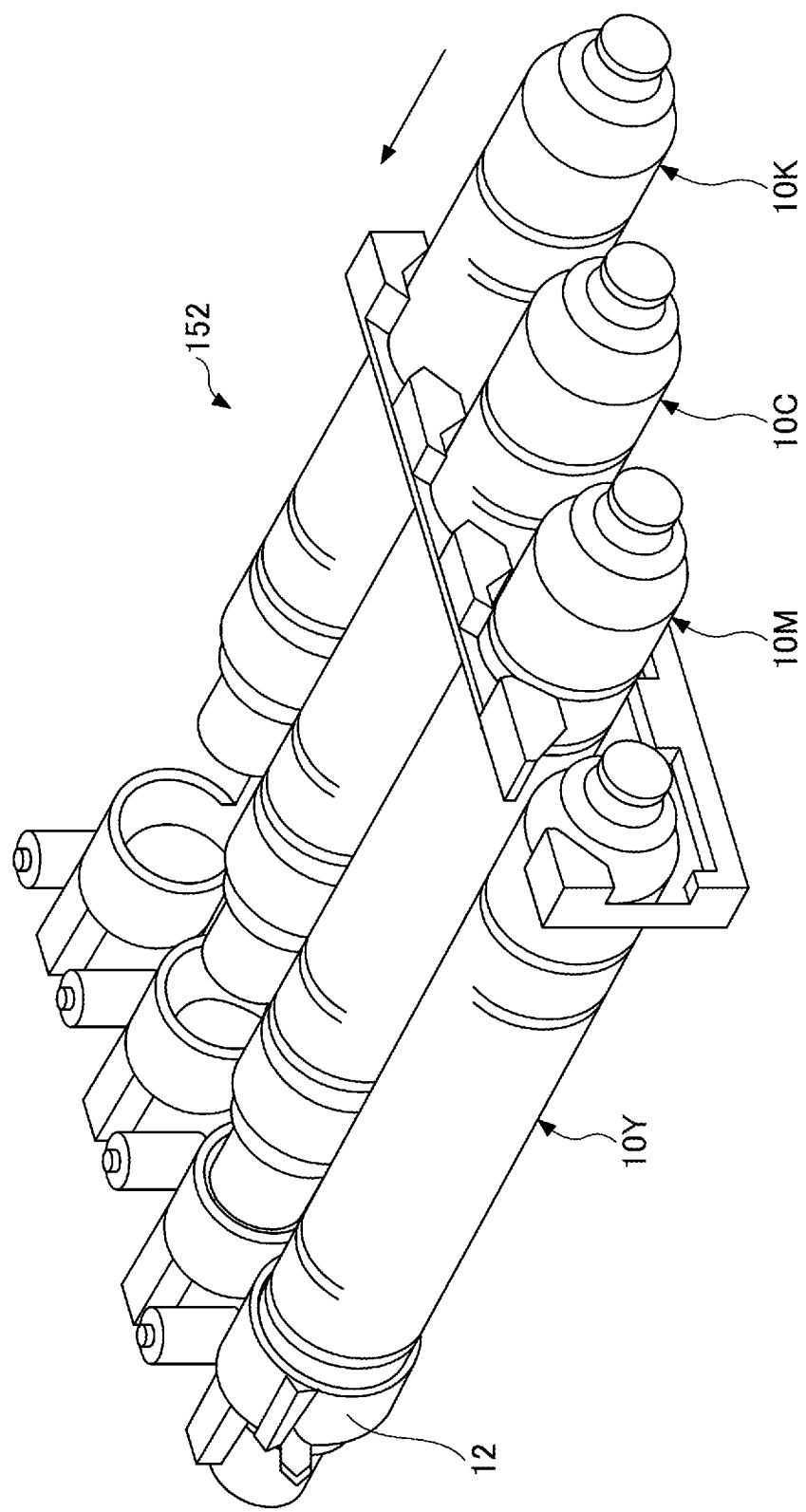
FIG. 4 is a partial oblique view illustrating an example of a state in which toner bottles are set in four toner bottle housings of FIG. 1.
Figure 5:
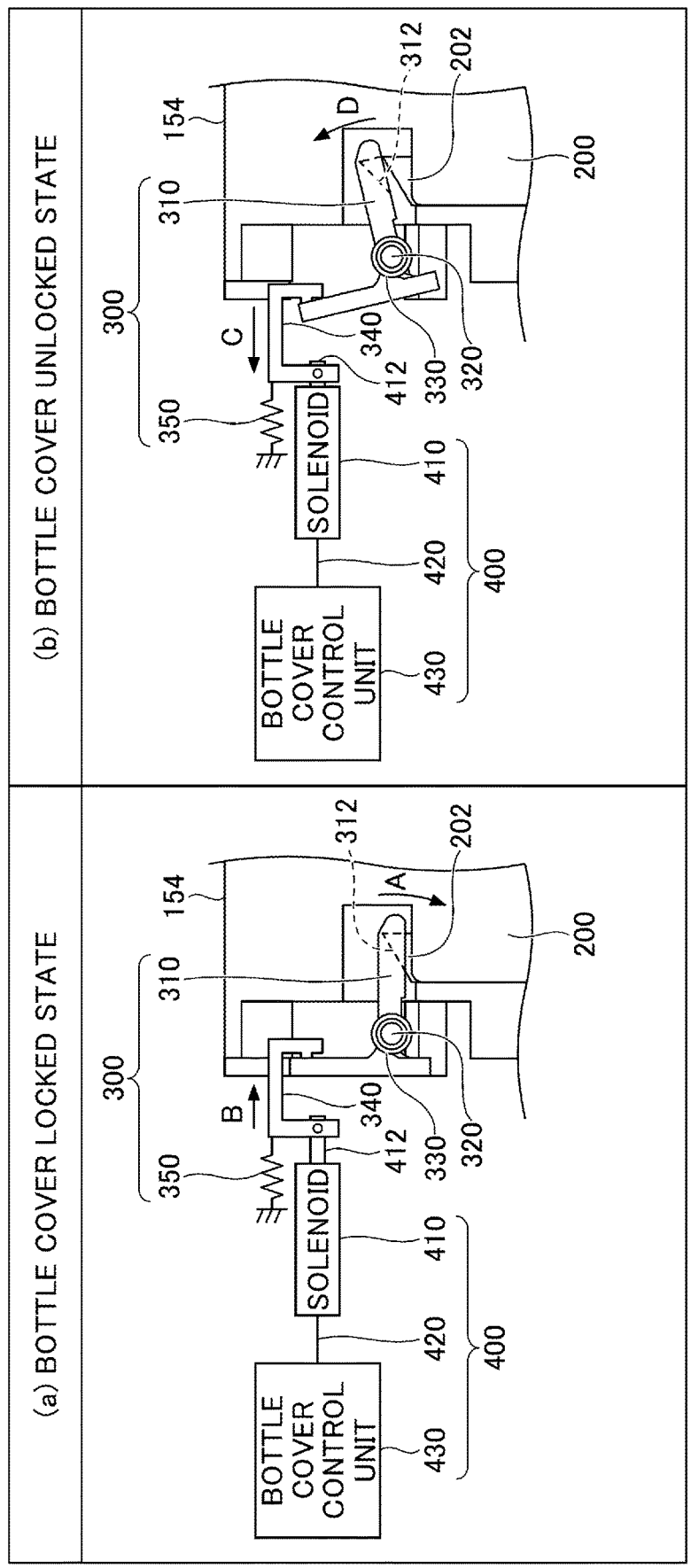
FIG. 5 is a drawing illustrating an example of a locked state and an unlocked state of the bottle cover of FIG. 3.

The locking mechanism 300 is configured to lock the bottle cover 200 at a position at which the bottle cover 200 covers the insertion opening 152a (FIG. 3) through which the toner bottle 10 is inserted. The actuating mechanism 400 is configured to unlock the bottle cover 200 being locked by the locking mechanism 300, to bring the bottle cover 200 into an open state. An example of the toner bottles 10 is illustrated in FIG. 4. An example of the locking mechanism 300 is illustrated in FIG. 3. An example of the operations of the locking mechanism 300 and the actuating mechanism 400 is illustrated in FIG. 5.

FIG. 1 illustrates the bottle covers 200, which are attached in front of the toner bottle housings 152 of the toner bottles 10Y, 10C, and 10M, as being in a closed state. To facilitate understanding of the description, these toner bottle housings 152 are illustrated as if they were seen through. The bottle cover 200 attached in front of the toner bottle housing 152 of the toner bottle 10K is illustrated as being in the open state, in which the toner bottle 10K can be inserted into and withdrawn from the toner bottle housing 152 in the frontward/rearward direction of the image forming apparatus 100. That is, the toner bottle 10 is replaceable in the state in which the bottle cover 200 is open.

The front cover 160 is attached in front of the image forming unit 150, and can be opened or closed by the user and the like. FIG. 1 illustrates the front cover 160 as being in an open state, in which the bottle covers 200 are exposed. An open/close sensor 162 configured to sense whether the front cover 160 is open or closed is attached to the front cover 160. The open/close sensor 162 is an example of an open/close sensing unit. The bottle covers 200 can become fully open in the state in which the front cover 160 is open. In a state in which the front cover 160 is closed, the bottle covers 200 are inhibited from becoming open. Hence, in a case where the front cover 160 is closed, the bottle covers 200 do not enter the open state merely by being unlocked from a locked state, and the open/close sensor 210 senses that the bottle covers 200 are in the closed state.

The operation control unit 500 is realized by a non-illustrated control board mounted with, for example, a controller such as a Central Processing Unit (CPU) and the like. The operation control unit 500 is configured to sense whether the bottle covers 200 are in the open state or the closed state based on information received from the open/close sensors 210, and to sense whether the front cover 160 is in the open state or the closed state based on information received from the open/close sensor 162. The operation control unit 500 may be realized by a System on Chip (SoC), a Field-Programmable Gate Array (FPGA), or the like.

For example, the operation control unit 500 controls the image forming apparatus 100 based on an operation received via the operation panel 132, to perform a copying operation and the like. The operation control unit 500 may control the image forming apparatus 100 based on an instruction received from an external device such as a PC. The operation control unit 500 also performs a fault sensing process to sense whether the actuating mechanism 400 is having a fault, as will be described with reference to FIG. 8 and FIG. 9.

The paper feeding cassette 170 accommodates sheets of paper and the like on which no toner image is formed yet. For example, the paper feeding cassette 170 can accommodate sheets of paper and the like that are varied in size. FIG. 1 illustrates an example in which two paper feeding cassettes 170 are situated in the image forming apparatus 100. The number of paper feeding cassettes 170 may be one, or may be three or more.

Figure 2:
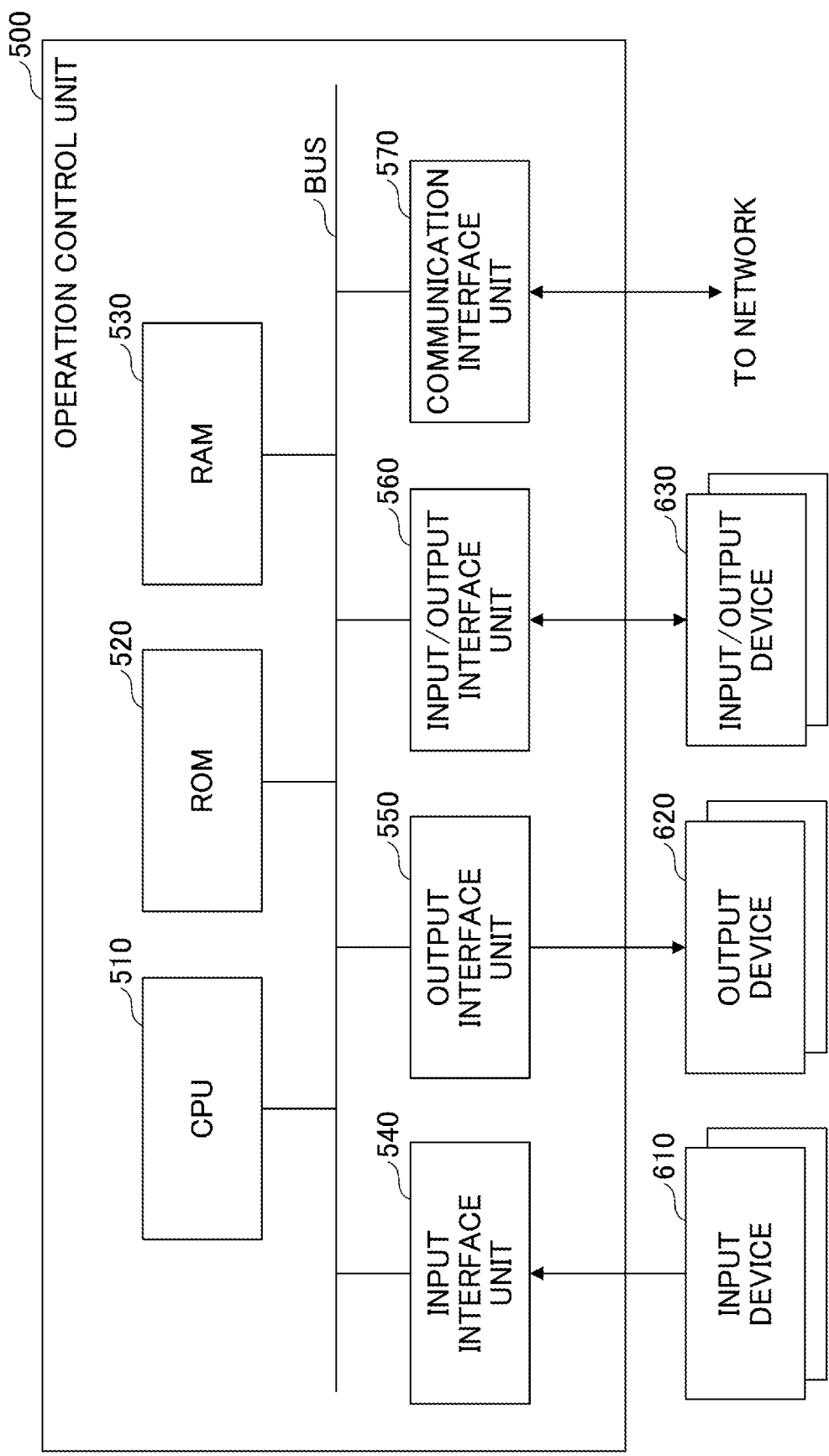
FIG. 2 is a block diagram illustrating an example of the hardware configuration of a control mechanism of FIG. 1.

FIG. 2 is a block diagram illustrating an example of the hardware configuration of the operation control unit 500 of FIG. 1. The operation control unit 500 includes a CPU 510, a Read Only Memory (ROM) 520, and a Random Access Memory (RAM) 530. The operation control unit 500 also includes an input interface unit 540, an output interface unit 550, an input/output interface unit 560, and a communication interface unit 570.

For example, the CPU 510, the ROM 520, the RAM 530, the input interface unit 540, the output interface unit 550, the input/output interface unit 560, and the communication interface unit 570 are mutually connected through a bus BUS.

The CPU 510 is configured to execute various programs such as an Operating System (OS), applications, and the like. The ROM 520 is configured to retain basic programs and various parameters necessary for various programs to be executed by the CPU 510. The RAM 530 is configured to store various programs executed by the CPU 510, data used in the programs, and the like. For example, various programs may include an image processing program for performing image processing of original document images read by the image reader 120, and a fault sensing program for sensing whether the actuating mechanism 400 is having a fault.

Input devices 610 such as the operation panel 132, the human-presence sensor 134, and the like are connected to the input interface unit 540. Output devices 620 such as the display unit of the operation panel 132, the image forming unit 150, and the like are connected to the output interface unit 550. Input/output devices 630 such as a Hard Disk Drive (HDD), a recording medium, and the like, which are non-illustrated, are connected to the input/output interface unit 560.

In a case where various programs such as the image processing program, the fault sensing program, and the like are stored in recording media, the programs are transferred to the RAM 530 and the like from the recording media via the input/output interface unit 560. The communication interface unit 570 can connect the operation control unit 500 to a network and the like, and can communicate with the service hub of the image forming apparatus 100.

FIG. 3 is a partial oblique view illustrating an example of the bottle cover 200 situated on the toner bottle housing 152 of FIG. 1. For example, a frame 154 configured for the bottle cover 200 to be attached inside is secured in front of the toner bottle housing 152. The frame 154 has a through-hole through which the toner bottle 10 can be inserted, at a position facing the insertion opening 152a of the toner bottle housing 152 into which the toner bottle 10 (see FIG. 1) is inserted. A latch 310 included in the locking mechanism 300, and the open/close sensor 210 are attached to the frame 154. The latch 310 and the open/close sensor 210 are situated at diagonal positions of the rectangular frame 154 with respect to the insertion opening 152a, although they are not particularly limited to this positioning.

The bottle cover 200 comes to a position to cover the insertion opening 152a when closed, and is secured to the frame 154 pivotally on a shaft member 220. The bottle cover 200 includes a hook 202 on an edge portion of the bottle cover 200 on a side opposite to the shaft member 220 side, the hook 202 sticking out from the edge portion. The hook 202 is situated at a position to be engaged with the latch 310 when the bottle cover 200 is in the closed state in which the bottle cover 200 is at a position to cover the insertion opening 152a. The latch 310 and the hook 202 are an example of the locking mechanism configured to lock the bottle cover 200 that is in the closed state. The detailed shapes of the latch 310 and the hook 202 and the method of engaging them will be described with reference to FIG. 5.

FIG. 4 is a partial oblique view illustrating a state in which the toner bottles 10 are set in the four toner bottle housings 152 of FIG. 1, respectively. FIG. 4 omits the bottle covers 200, but FIG. 4 corresponds to a state in which the bottle covers 200 become open as a result of being unlocked from the locking mechanism. When loading the image forming apparatus 100 with a toner, the toner bottle 10 (10Y, 10M, 10C, or 10K) is inserted into the toner bottle housing 152 along the direction of the arrow.

The toner bottle 10 has an approximately cylindrical shape, and is rotatably held relative to a cap that is non-rotatably held on the toner bottle housing 152, although the toner bottle 10 is not particularly limited to this configuration. The toner bottle 10 put into the toner bottle housing 152 is moved in the direction of the arrow of FIG. 4 while being rotated.

In response to an end of the toner bottle 10 being fitted in a cap receptacle 12, the toner bottle 10 becomes connected to a toner tank via a non-illustrated toner supply device that is situated at the rear side of the cap receptacle 12. The toner filled in the toner bottle 10 is appropriately stored in the toner tank.

For example, in a case where a non-illustrated toner remaining amount sensing unit senses that the toner in the toner bottle 10 has become lower than or equal to a predetermined amount, information indicating "no toner" is displayed on the screen of the operation panel 132. When the user, having seen the screen, presses a "confirm" button on the operation panel 132 and opens the front cover 160, the open/close sensor 162 senses that the front cover 160 has entered the open state, causing the solenoid 410 to be actuated and the bottle cover 200 to be opened. Hence, the toner bottle 10 housed in the position corresponding to the opened bottle cover 200 becomes removable and replaceable with a new toner bottle 10.

FIG. 5 is a drawing illustrating an example of a locked state and an unlocked state of the bottle cover 200 of FIG. 3. The locking mechanism 300 illustrated in FIG. 1 includes the latch 310, a shaft member 320, a helical torsion spring 330, a link 340, and a coil spring 350. The actuating mechanism 400 illustrated in FIG. 1 includes the solenoid 410, a control line 420, and a bottle cover control unit 430. The solenoid 410 is an example of the unlocking member configured to bring the bottle cover 200 into an open state not covering the insertion opening 152a (FIG. 3). Any component (e.g., a transistor Q1 of FIG. 6) of the bottle cover control unit 430 that is involved in actuating the solenoid 410 is an example of the actuator configured to actuate the solenoid 410.

The latch 310 has an L-letter shape, and is pivotally supported on the shaft member 320 situated at the flexural portion of the L-letter. The helical torsion spring 330, which is configured to bias one end of the L-letter-shaped latch 310 in a direction A toward the bottle cover 200 side, is situated around the shaft member 320.

A recess 312 having a shape conforming to the shape of the hook 202 of the bottle cover 200 is formed in a portion of the latch 310 on the biased one end side. The hook 202 being engaged with the recess 312 of the latch 310 is restricted from moving with respect to the frame 154, keeping the bottle cover 200 in the closed state.

The internal side of the other end of the latch 310 contacts the internal side of one end side of the link 340 having an acute-angled-U-letter shape. The other end side of the link 340 is joined to a rod 412 of the solenoid 410. The coil spring 350 configured to bias the link 340 in a direction B toward the latch 310 side is attached to the link 340. The solenoid 410 is connected to the bottle cover control unit 430 through the control line 420, and is actuated by the bottle cover control unit 430.

While the solenoid 410 is not actuated by the bottle cover control unit 430 in the state (a) illustrated in FIG. 5, the rod 412 can freely move. Here, the latch 310 pivots in the direction A due to the flexural stress in the helical torsion spring 330, causing the hook 202 to be engaged with the recess 312. The link 340, which is under the biasing force from the coil spring 350, moves in the direction B while keeping in contact with the end of the latch 310, following the pivoting of the latch 310. Hence, the bottle cover 200 is locked within the frame 154 in a state of covering the insertion opening 152a (FIG. 3) for the toner bottle 10.

In response to being actuated by the bottle cover control unit 430 in the state (b) illustrated in FIG. 5, the solenoid 410 retracts the rod 412 in the direction C. This causes the link 340 to move in the direction C, to push the other end of the latch 310 in the direction C, to cause the latch 310 to pivot in the direction D by resisting the flexural stress in the helical torsion spring 330. The hook 202 is disengaged from the recess 312, to cause the bottle cover 200 to be unlocked from the frame 154.

In the state of being unlocked from the frame 154, the bottle cover 200 is structured to pivot in a direction in which the hook 202 is separated from the frame 154 due to the gravitational force, a spring force, or the like. Hence, after the state (b), the bottle cover 200 automatically becomes open. In the case of FIG. 1 in which the front cover 160 is opened, the bottle cover 200 becomes fully open, and it is possible to insert or withdraw the toner bottle 10 into or from the insertion opening 152a (FIG. 3). The open/close sensor 210 (FIG. 3) senses that the bottle cover 200 has become open.

The bottle cover control unit 430 stops actuating the solenoid 410 after the bottle cover 200 has become open. Hence, the link 340 and the latch 310 return to the positions illustrated in the state (a). In response to the bottle cover 200 being closed by the user with the toner bottle 10 replaced, the one end of the latch 310 is pushed by the hook 202. The latch 310 pivots in the direction D illustrated in the state (b) by resisting the flexural stress in the helical torsion spring 330 until the hook 202 is engaged in the recess 312. Then, the bottle cover 200 is locked within the frame 154 again as illustrated in the state (a) of FIG. 5.

Figure 6:
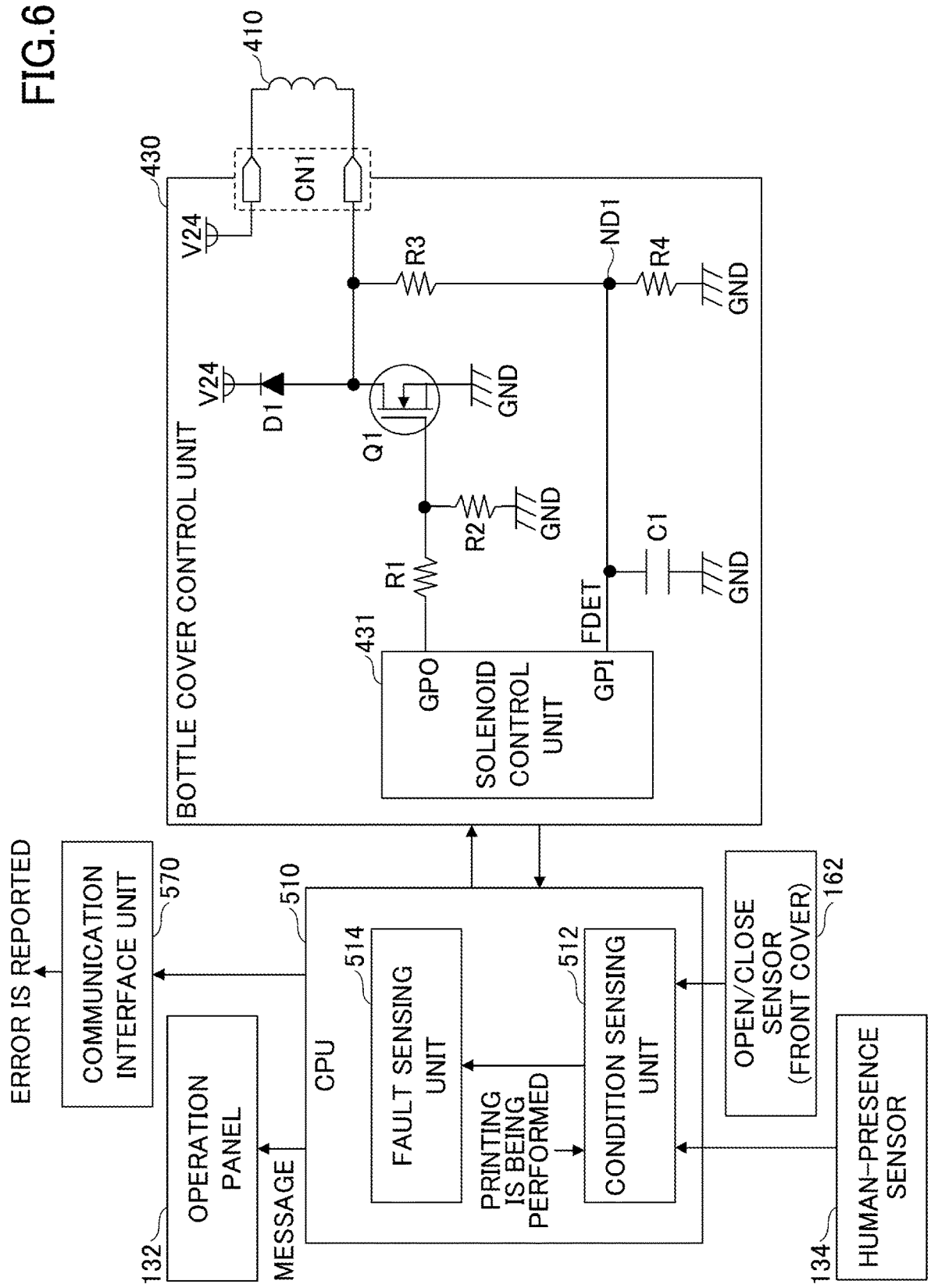
FIG. 6 is a block diagram illustrating an example of functions of a CPU of FIG. 2 and a bottle cover control unit of FIG. 5.

FIG. 6 is a block diagram illustrating an example of the functions of the CPU 510 of FIG. 2 and the bottle cover control unit 430 of FIG. 5. The CPU 510 includes a condition sensing unit 512 and a fault sensing unit 514. For example, the condition sensing unit 512 and the fault sensing unit 514 may be realized by the fault sensing program executed by the CPU 510.

The condition sensing unit 512 is configured to receive information indicating whether the user is present in front of the image forming apparatus 100 or not from the human-presence sensor 134, to determine presence or absence of a possibility that the front cover 160 is going to be opened. The condition sensing unit 512 is also configured to receive information indicating whether the front cover 160 is in the open state or the closed state from the open/close sensor 162, and to receive information indicating an operating status of the image forming unit 150, the operating status being generated in the CPU 510, as information indicating whether printing is being performed or not.

The condition sensing unit 512 determines whether or not to perform sensing of whether the actuating mechanism 400 is having a fault based on the possibility that the front cover 160 is going to be opened, whether the front cover 160 is in the open state or the closed state, and whether printing is being performed or not, and informs the result of the determination to the fault sensing unit 514. An example of determination performed by the condition sensing unit 512 is illustrated in FIG. 7.

In a case of receiving an instruction to perform sensing of whether the actuating mechanism 400 is having a fault from the condition sensing unit 512, the fault sensing unit 514 performs a fault sensing process to sense whether the actuating mechanism 400 is having a fault based on information received from the bottle cover control unit 430.

Figure 8:
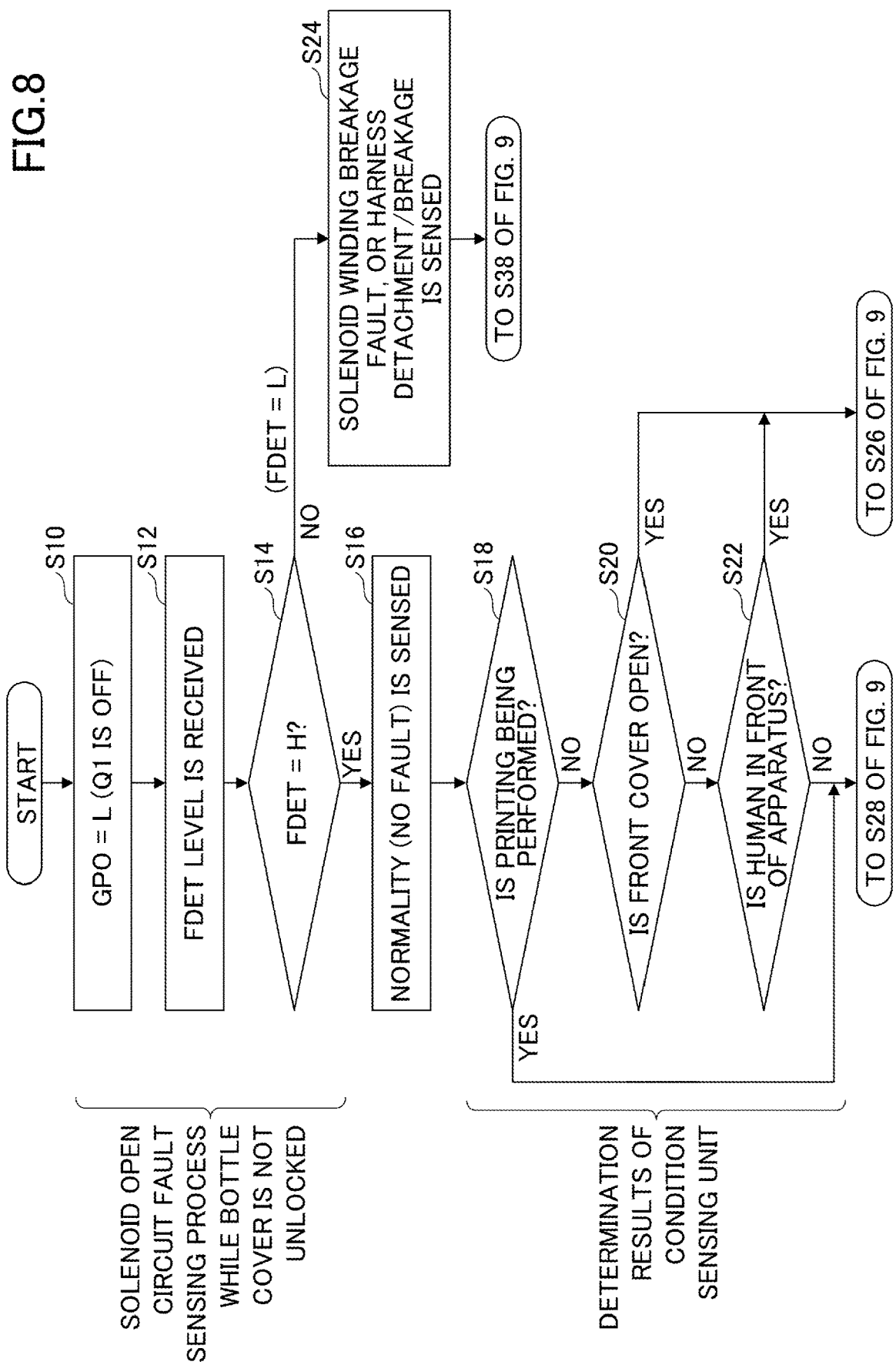
Figure 9:
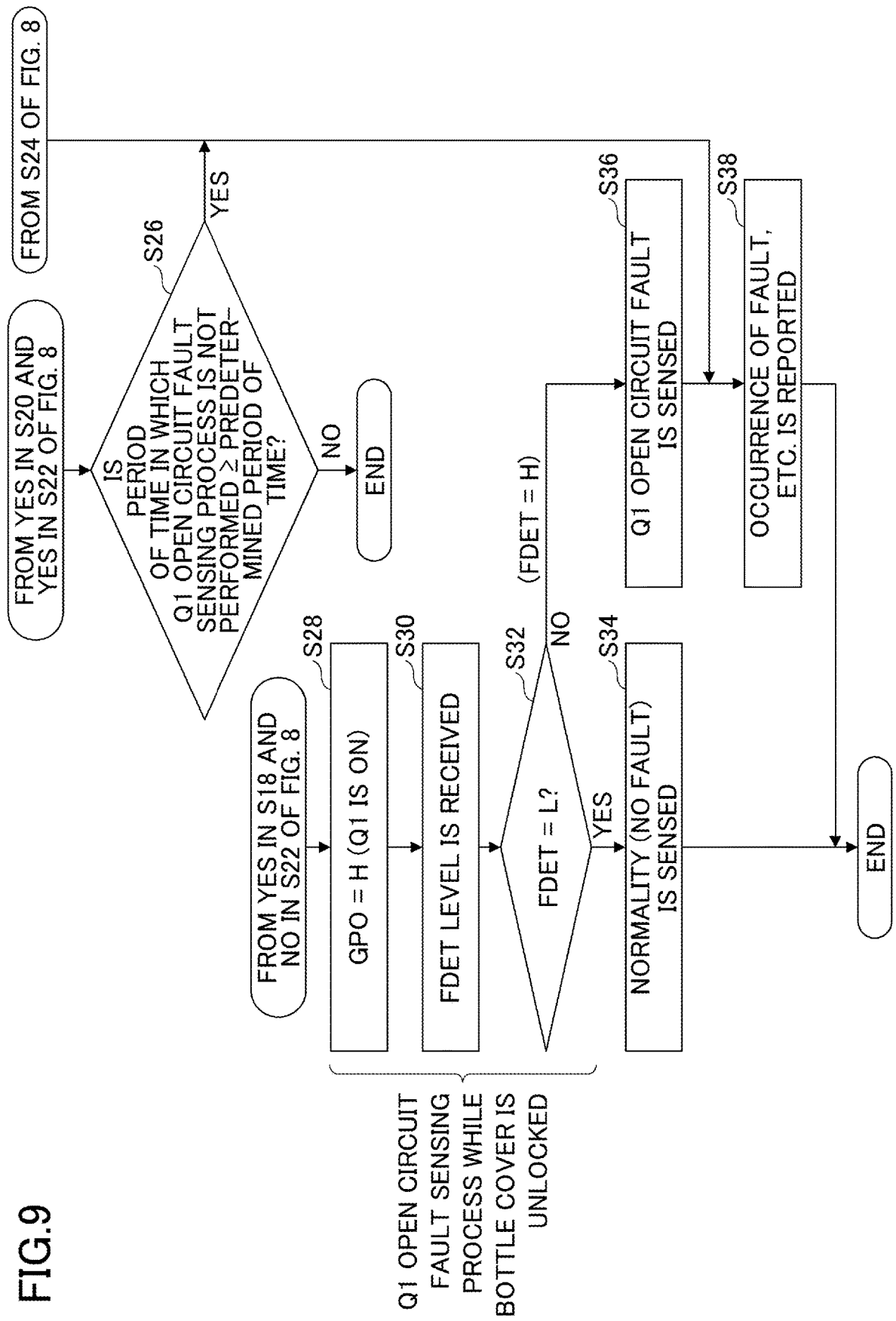
FIG. 9 is a flowchart illustrating the continuation from FIG. 8.

For example, in a case of sensing an open circuit fault of the solenoid 410 or an open circuit fault of the transistor Q1 through the fault sensing process, the fault sensing unit 514 may display an error message indicating occurrence of the fault and a service call prompting asking for a repair on the display unit of the operation panel 132. The fault sensing unit 514 may inform the occurrence of the fault to the service hub of the image forming apparatus 100 or the like via the communication interface unit 570. In this case, the fault sensing unit 514 may display a message indicating that the occurrence of the fault has been informed to the service hub or the like on the display unit of the operation panel 132. An example of the operation of the fault sensing unit 514 is illustrated in FIG. 8 and FIG. 9.

The bottle cover control unit 430 includes a solenoid control unit 431, the transistor Q1, a diode D1, resistors R1, R2, R3, and R4, a capacitor C1, and a connector CN1. The solenoid control unit 431 includes a general-purpose output port GPO configured to control the gate voltage of the transistor Q1 and a general-purpose input port GPI configured to receive a fault detection signal FDET, and can exchange information with the CPU 510.

For example, the solenoid control unit 431 may be realized by a microcomputer mounted on the bottle cover control unit 430. In the following description, the general-purpose output port GPO and the general-purpose input port GPI are referred to as the output port GPO and the input port GPI, respectively. The output port GPO is connected to the gate of the transistor Q1 via the resistor R1. The gate of the transistor Q1 is connected (pulled down) to a ground line GND via the resistor R2.

The source of the transistor Q1 is connected to the ground line GND. The drain of the transistor Q1 is connected to the anode of the diode D1, and is connected to a power source line V24 via the diode D1. The drain of the transistor Q1 is also connected to one end of the solenoid 410 via the connector CN1. The other end of the solenoid 410 is connected to the power source line V24.

The drain of the transistor Q1 is also connected to the ground line GND via the resistors R3 and R4 connected in series. A voltage level, which is a divided voltage of the drain voltage of the transistor Q1, is generated at a connection node ND1 between the resistors R3 and R4 as the fault detection signal FDET. The connection node ND1 is connected to the ground line GND via the capacitor C1.

In a case of receiving an instruction to control the solenoid 410 to be ON to open the bottle cover 200 from the CPU 510, the solenoid control unit 431 outputs a voltage for turning ON the transistor Q1 to the gate of the transistor Q1 from the output port GPO. In a case of receiving an instruction to not control the solenoid 410 to be ON from the CPU 510, the solenoid control unit 431 outputs a voltage for turning OFF the transistor Q1 to the gate of the transistor Q1 from the output port GPO.

While the solenoid 410 is controlled to be OFF, the solenoid control unit 431 can sense whether the solenoid 410 is having a winding breakage fault, a fault due to harness detachment from the connector CN1, or a harness breakage fault. In the following description, a solenoid 410's winding breakage fault, a fault due to harness detachment from the connector CN1, and a harness breakage fault may also be referred to collectively as solenoid open circuit faults. In the following description, a fault will be described as being a single fault.

While the solenoid 410 is controlled to be OFF, the transistor Q1 is turned OFF. Hence, in a case where the solenoid 410 and the harness connected to the connector CN1 are normal (in a case where no solenoid open circuit fault is occurring), the connection node ND1 is at a divided voltage resulting from the power source voltage V24 being divided in accordance with the resistors R3 and R4, and the fault detection signal FDET is set to a high level.

On the other hand, in a case where a solenoid open circuit fault is occurring, the connection node ND1 is at the ground voltage GND because of the resistor R3 not being connected to the power source line V24, and the fault detection signal FDET is set to a low level. Hence, in a case where the fault detection signal FDET is at the low level while the solenoid 410 is controlled to be OFF, the solenoid control unit 431 can sense a solenoid open circuit fault.

While the solenoid 410 is controlled to be ON, the solenoid control unit 431 can sense whether the transistor Q1 is having an open circuit fault. In the following description, the open circuit fault of the transistor Q1 is also referred to as a transistor open circuit fault. While the solenoid 410 is controlled to be ON, the solenoid control unit 431 attempts to turn ON the transistor Q1. In a case where the transistor Q1 is normal, the transistor Q1 becomes turned ON, the connection node ND1 becomes set to the ground voltage GND, and the fault detection signal FDET becomes set to the low level.

On the other hand, in a case where the transistor Q1 is having an open circuit fault, the connection node ND1 is at a divided voltage resulting from the power source voltage V24 being divided in accordance with the resistors R3 and R4, and the fault detection signal FDET is set to the high level. Hence, in a case where the fault detection signal FDET is at the high level while the solenoid 410 is controlled to be ON, the solenoid control unit 431 can sense a transistor open circuit fault.

In a case where the transistor Q1 is normal, sensing of whether the transistor Q1 is having a transistor open circuit fault causes the bottle cover 200 to be unlocked and become open at an unintentional timing, because the solenoid 410 is being controlled to be ON. In a case where the bottle cover 200 becomes open at an unintentional timing while the user is present in front of the image forming apparatus 100, the user may suspect a fault of the image forming apparatus 100.

For example, the user present in front of the image forming apparatus 100 is always able to open the front cover 160. In a case where the user opens the front cover 160 concurrently with a transistor open circuit fault being sensed, the bottle cover 200 may open just in front of the user. Hence, it is preferable that sensing of any transistor open circuit fault is not performed in a case where the user is present in front of the image forming apparatus 100.

A solenoid open circuit fault and a transistor open circuit fault may be sensed by the fault sensing unit 514. In this case, the solenoid control unit 431 outputs the logic level of the fault detection signal FDET received at the input port GPI to the CPU 510.

FIG. 7 is a diagram illustrating an example of a determining process according to which the condition sensing unit 512 of FIG. 6 determines whether or not to perform fault sensing for an ON control period of the solenoid 410 and for an OFF control period of the solenoid 410. Fault sensing for an ON control period of the solenoid 410 is an example of the first fault sensing process. Fault sensing for an OFF control period of the solenoid 410 is an example of a second fault sensing process. The fault sensing for an ON control period of the solenoid 410 and for an OFF control period of the solenoid 410 is performed repeatedly at a predetermined cycle.

In a case where the image forming unit 150 is not performing a printing operation and the front cover 160 is closed, the condition sensing unit 512 determines whether or not to perform the fault sensing for an ON control period of the solenoid 410 in accordance with a human sensing status of the human-presence sensor 134. In a case where the human-presence sensor 134 is sensing no human presence in front of the image forming apparatus 100, the condition sensing unit 512 determines to perform the fault sensing for an ON control period of the solenoid 410. In this case, the condition sensing unit 512 outputs an instruction to control the transistor Q1 to be ON to the bottle cover control unit 430 at a timing for the fault sensing for an ON control period of the solenoid 410.

On the other hand, in a case where the human-presence sensor 134 is sensing presence of a human in front of the image forming apparatus 100, the condition sensing unit 512 determines to not perform the fault sensing for an ON control period of the solenoid 410. In this case, the condition sensing unit 512 does not output an instruction to control the transistor Q1 to be ON to the bottle cover control unit 430 even when a timing for the fault sensing for an ON control period of the solenoid 410 has come. Hence, it is possible to inhibit the bottle cover 200 from becoming open due to the fault sensing while a human is present in front of the image forming apparatus 100.

In a case where the image forming unit 150 is not performing a printing operation and the front cover 160 is open, the condition sensing unit 512 determines to not perform the fault sensing for an ON control period of the solenoid 410 irrespective of a human sensing status of the human-presence sensor 134. In this case, the condition sensing unit 512 does not output an instruction to control the transistor Q1 to be ON to the bottle cover control unit 430 even when a timing for the fault sensing for an ON control period of the solenoid 410 has come.

Hence, it is possible to inhibit the bottle cover 200 from becoming open due to the fault sensing while the front cover 160 is open, and to inhibit a toner bottle 10 in which a toner is remaining from being put in a replaceable state. As a result, it is possible to inhibit a toner that is ready to be used for printing from being discarded wastefully. Moreover, it is possible to avoid the user suspecting a fault and the like of the image forming apparatus 100 even though no fault is occurring.

Moreover, in a case where the image forming unit 150 is performing a printing operation, the fault sensing for an ON control period of the solenoid 410 is determined to be performed irrespective of whether the front cover 160 is in the open state or the closed state and the human sensing status of the human-presence sensor 134. Because there are no chances of the front cover 160 being opened during a printing operation, it is possible to perform the fault sensing for an ON control period of the solenoid 410 even when the user is present in front of the image forming apparatus 100.

The fault sensing for an OFF control period of the solenoid 410 is constantly performed irrespective of the printing status, whether the front cover 160 is in the open state or the closed state, and a human sensing status of the human-presence sensor 134. That is, when a timing for the fault sensing for an OFF control period of the solenoid 410 has come, an instruction to control the transistor Q1 to be OFF is output to the bottle cover control unit 430. Hence, it is possible to separate a plurality of causes of faults from each other before a repair. As a result, it is possible to quicken the repair and shorten the downtime in the event of a fault of the image forming apparatus 100.

FIG. 8 and FIG. 9 are flowcharts illustrating an example of a process according to which the CPU 510 of FIG. 6 senses a fault of the solenoid 410, the transistor Q1, and the like. That is, FIG. 8 and FIG. 9 illustrate an example of the fault sensing method for the image forming apparatus 100. FIG. 8 and FIG. 9 also illustrate an example of the fault sensing program executed by the CPU 510. The process illustrated in FIG. 8 and FIG. 9 is performed repeatedly at a predetermined cycle.

First, in the step S10, the CPU 510 outputs an instruction to the bottle cover control unit 430 to output a low level L from the output port GPO to turn OFF the transistor Q1. Next, in the step S12, the CPU 510 receives from the bottle cover control unit 430, the level of the fault detection signal FDET received at the input port GPI. Next, in the step S14, the CPU 510 moves the flow to the step S16 in a case where the fault detection signal FDET is the high level H, and moves the flow to the step S24 in a case where the fault detection signal FDET is the low level L.

In the step S24, the CPU 510 senses that the solenoid is having a solenoid open circuit fault (a solenoid 410's winding breakage fault, a fault due to harness detachment from the connector CN1, or a harness breakage fault). Because the process for sensing a solenoid open circuit fault involves no user's operation, it is possible to inhibit the cause of a fault from being misidentified due to a user's operation mistake, and to shorten the downtime. After the process of the step S24, the CPU 510 moves the flow to the step S38 of FIG. 9. In the step S16, the CPU 510 senses that the solenoid 410 and the connector CN1 are normal (not having a fault).

Next, in the step S18, the CPU 510 determines whether printing is being performed or not based on a result of determination performed by the condition sensing unit 512, and moves the flow to the step S28 of FIG. 9 in a case where printing is being performed and moves the flow to the step S20 in a case where printing is not being performed.

In the step S20, the CPU 510 determines whether the front cover 160 is open or not based on a result of determination performed by the condition sensing unit 512, and moves the flow to the step S26 of FIG. 9 in a case where it is open and moves the flow to the step S22 in a case where it is closed.

In the step S22, the CPU 510 determines whether a human is present in front of the image forming apparatus 100 or not based on a result of determination performed by the condition sensing unit 512, and moves the flow to the step S26 of FIG. 9 in a case where a human is present and moves the flow to the step S28 of FIG. 9 in a case where no human is present.

In the step S26 of FIG. 9, the CPU 510 determines whether a period of time in which the process for sensing an open circuit fault of the transistor Q1 is not performed is longer than or equal to a predetermined period of time or not. The CPU 510 moves the flow to the step S38 in a case where the process for sensing an open circuit fault of the transistor Q1 has not been performed for the predetermined period or longer. The CPU 510 ends the process illustrated in FIG. 8 and FIG. 9 in a case where the predetermined period has not elapsed since the process for sensing an open circuit fault of the transistor Q1 has been performed.

In the step S28, the CPU 510 outputs an instruction to the bottle cover control unit 430 to output the high level H from the output port GPO to turn ON the transistor Q1. Next, in the step S30, the CPU 510 receives from the bottle cover control unit 430, the level of the fault detection signal FDET received at the input port GPI. Next, in the step S32, the CPU 510 moves the flow to the step S34 in a case where the fault detection signal FDET is the low level L, and moves the flow to the step S36 in a case where the fault detection signal FDET is the high level H.

In the step S34, the CPU 510 senses that the transistor Q1 is normal (having no fault), and ends the process illustrated in FIG. 8 and FIG. 9. In the step S36, the CPU 510 senses that the transistor Q1 is having an open circuit fault, and moves the flow to the step S38. Because the process for sensing an open circuit fault of the transistor Q1 involves no user's operation, it is possible to inhibit the cause of a fault from being misidentified due to a user's operation mistake, and to shorten the downtime.

In the step S38, the CPU 510 reports occurrence of the fault and the like to the service hub or the like via the communication interface unit 570, and ends the process illustrated in FIG. 8 and FIG. 9. By reporting occurrence of a fault to the service hub or the like in response to an open circuit fault of the transistor Q1 or a solenoid open circuit fault being sensed, it is possible to quicken a repair of the image forming apparatus 100 and further shorten the downtime.

By reporting to the service hub or the like that the process for sensing an open circuit fault of the transistor Q1 has not been performed for the predetermined period or longer when this is the case, it is possible to prompt, for example, a maintenance worker to perform a fault sensing work at a regular maintenance visit or the like, and to find a fault early. In a case where the step S38 is performed, the operation of the image forming apparatus 100 is stopped. Hence, the process illustrated in FIG. 8 and FIG. 9 is not repeated.

According to the present embodiment, it is possible to sense whether the transistor Q1 is having an open circuit fault by controlling the solenoid 410 to be ON at a timing at which no human is present in front of the image forming apparatus 100 in accordance with the human-presence sensor 134, the illuminance sensor, or the timer. The process for sensing an open circuit fault of the transistor Q1 by controlling the solenoid 410 to be ON is not performed while the front cover 160 is open. Hence, it is possible to inhibit the bottle cover 200 from becoming open due to the fault sensing being performed while the front cover 160 is open, and to inhibit a toner bottle 10 in which a toner is remaining from being put in a replaceable state. As a result, it is possible to inhibit a toner that is ready to be used for printing from being discarded wastefully.

By controlling the solenoid 410 to be OFF, it is possible to sense whether there is a solenoid open circuit fault (a solenoid 410's winding breakage fault, a fault due to harness detachment from the connector CN1, or a harness breakage fault). Because it is possible to separate a plurality of causes of faults from each other before a repair, it is possible to quicken the repair and shorten the downtime in the event of the image forming apparatus 100 having a fault.

Moreover, it is possible to sense a plurality of fault modes such as an open circuit fault of the transistor Q1, a solenoid 410's winding breakage fault, and the like without prompting a user's operation via the operation panel 132. Because no user's operation is involved, it is possible to inhibit the cause of a fault from being misidentified due to a user's operation mistake. As a result, it is possible to further shorten the downtime.

By performing the fault sensing process by controlling the solenoid 410 to be ON at a timing at which there is a low possibility of a human being present in front of the image forming apparatus 100 in accordance with the illuminance sensor or the timer, it is possible to perform fault sensing at a timing at which there is a low urgency for the recovery from a fault. By performing the fault sensing for an ON control period of the solenoid 410 during a printing operation being performed during which there are no chances of the front cover 160 being opened, it is possible to perform fault sensing even while the user is present in front of the image forming apparatus 100.

By reporting occurrence of a fault to the service hub or the like in response to an open circuit fault of the transistor Q1 or a solenoid open circuit fault being sensed, it is possible to quicken a repair of the image forming apparatus 100 and further shorten the downtime.

By reporting to the service hub or the like that the process for sensing an open circuit fault of the transistor Q1 has not been performed for the predetermined period or longer when this is the case, it is possible to prompt, for example, a maintenance worker to perform a fault sensing work at a regular maintenance visit or the like, and to find a fault early.

Aspects of the present disclosure are, for example, as follows.

<1>

An image forming apparatus, including:
  an image forming unit configured to form an image;
  a toner bottle housing configured to house a toner bottle in a withdrawably insertable manner, the toner bottle being filled with a toner used by the image forming unit to form an image;
  a bottle cover situated such that the bottle cover can open or close an insertion opening of the toner bottle housing;
  a locking mechanism configured to lock the bottle cover being in a closed state in which the bottle cover is at a position to cover the insertion opening;
  an actuating mechanism including an unlocking member configured to unlock the bottle cover, being in a locked state, to bring the bottle cover into an open state in which the bottle cover does not cover the insertion opening, and an actuator configured to actuate the unlocking member;
  a front cover situated in an openable/closable manner in front of the bottle cover and configured to inhibit the bottle cover from becoming open while the front cover is in a closed state;
  a fault sensing unit configured to perform a first fault sensing process in which the actuator is sensed as having a fault in a case where the actuator fails to actuate the unlocking member in spite of the actuator being driven while the image forming unit is non-operating; and
  a condition sensing unit configured to sense presence of a possibility that the front cover is going to be opened,
  wherein the fault sensing unit is excluded from performing the first fault sensing process while the condition sensing unit is sensing the possibility as being present.

<2>

The image forming apparatus according to <1>,
  wherein the fault sensing unit performs a second fault sensing process irrespective of whether the condition sensing unit is sensing the possibility as being present or not, the second fault sensing process being a process in which the unlocking member is sensed as having a fault in a case where an operating state of the unlocking member while the unlocking member is being unactuated by the actuator represents anything other than a state of being unactuated by the actuator.

<3>

The image forming apparatus according to <1> or <2>, further including an open/close sensing unit configured to sense whether the front cover is in an open state or the closed state, wherein in a case where the open/close sensing unit is sensing that the front cover is in the open state, the fault sensing unit is excluded from performing the first fault sensing process irrespective of whether the condition sensing unit is sensing the possibility as being present or not.

<4>

The image forming apparatus according to any one of <1> to <3>, wherein the condition sensing unit senses the possibility as being present in a case of sensing that a user is present in front of the front cover.

<5>

The image forming apparatus according to any one of <1> to <3>, wherein the condition sensing unit senses the possibility as being present in a time slot in which there is a possibility that a user is present in front of the front cover based on a timer or an illuminance of an environment in which the image forming apparatus is installed.

<6>

The image forming apparatus according to any one of <1> to <5>, wherein while the image forming unit is operating, the fault sensing unit performs the first fault sensing process irrespective of whether the condition sensing unit is sensing the possibility as being present or not.

<7>

The image forming apparatus according to any one of <1> to <6>, wherein in a case of sensing a fault of the actuator, the fault sensing unit reports the fault to an external entity of the image forming apparatus.

<8>

The image forming apparatus according to any one of <1> to <7>, wherein in a case of failing to perform the first fault sensing process even once in a predetermined period of time, the fault sensing unit reports a failure to perform the first fault sensing process to an external entity of the image forming apparatus.

<9>

A fault sensing method for an image forming apparatus, the image forming apparatus including an image forming unit configured to form an image, a toner bottle housing configured to house a toner bottle in a withdrawably insertable manner, the toner bottle being filled with a toner used by the image forming unit to form an image, a bottle cover situated such that the bottle cover can open or close an insertion opening of the toner bottle housing, a locking mechanism configured to lock the bottle cover being in a closed state in which the bottle cover is at a position to cover the insertion opening, an actuating mechanism including an unlocking member configured to unlock the bottle cover, being in a locked state, to bring the bottle cover into an open state in which the bottle cover does not cover the insertion opening, and an actuator configured to actuate the unlocking member, and a front cover situated in an openable/closable manner in front of the bottle cover and configured to inhibit the bottle cover from becoming open while the front cover is in a closed state, the fault sensing method including:

performing a first fault sensing process in which the actuator is sensed as having a fault in a case where the actuator fails to actuate the unlocking member in spite of the actuator being driven while the image forming unit is non-operating; and sensing presence of a possibility that the front cover is going to be opened, wherein the first fault sensing process is excluded from being performed while the possibility is sensed as being present in the sensing of presence of the possibility.

<10>

A non-transitory computer-readable recording medium storing a fault sensing program for an image forming apparatus, the image forming apparatus including an image forming unit configured to form an image, a toner bottle housing configured to house a toner bottle in a withdrawably insertable manner, the toner bottle being filled with a toner used by the image forming unit to form an image, a bottle cover situated such that the bottle cover can open or close an insertion opening of the toner bottle housing, a locking mechanism configured to lock the bottle cover being in a closed state in which the bottle cover is at a position to cover the insertion opening, an actuating mechanism including an unlocking member configured to unlock the bottle cover, being in a locked state, to bring the bottle cover into an open state in which the bottle cover does not cover the insertion opening, and an actuator configured to actuate the unlocking member, and a front cover situated in an openable/closable manner in front of the bottle cover and configured to inhibit the bottle cover from becoming open while the front cover is in a closed state, wherein when executed by a computer, the fault sensing program causes the computer to:

perform a first fault sensing process in which the actuator is sensed as having a fault in a case where the actuator fails to actuate the unlocking member in spite of the actuator being driven while the image forming unit is non-operating; and sense presence of a possibility that the front cover is going to be opened, wherein the first fault sensing process is excluded from being performed while the possibility is sensed as being present in the sensing of presence of the possibility.

The present disclosure has been described above based on the embodiment. However, the present disclosure is not limited to the requirements specified in the embodiment described above. The specified particulars can be changed as long as the spirit of the present disclosure is not spoiled, and can be defined appropriately to suit to the mode of application of the present disclosure.

What is claimed is:

1. An image forming apparatus, comprising:

an image forming unit configured to form an image;

a toner bottle housing configured to house a toner bottle in a withdrawably insertable manner, the toner bottle being filled with a toner used by the image forming unit to form an image;

a bottle cover situated such that the bottle cover can open or close an insertion opening of the toner bottle housing;

a locking mechanism configured to lock the bottle cover being in a closed state in which the bottle cover is at a position to cover the insertion opening;

an actuating mechanism including an unlocking member configured to unlock the bottle cover, being in a locked state, to bring the bottle cover into an open state in which the bottle cover does not cover the insertion opening, and an actuator configured to actuate the unlocking member;

a front cover situated in an openable/closable manner in front of the bottle cover and configured to inhibit the bottle cover from becoming open while the front cover is in a closed state;

a fault sensing unit configured to perform a first fault sensing process in which the actuator is sensed as having a fault in a case where the actuator fails to actuate the unlocking member in spite of the actuator being driven while the image forming unit is non-operating; and a condition sensing unit configured to sense presence of a possibility that the front cover is going to be opened, wherein the fault sensing unit is excluded from performing the first fault sensing process while the condition sensing unit is sensing the possibility as being present.

2. The image forming apparatus according to claim 1, wherein the fault sensing unit performs a second fault sensing process irrespective of whether the condition sensing unit is sensing the possibility as being present or not, the second fault sensing process being a process in which the unlocking member is sensed as having a fault in a case where an operating state of the unlocking member while the unlocking member is being unactuated by the actuator represents anything other than a state of being unactuated by the actuator.

3. The image forming apparatus according to claim 1, further comprising an open/close sensing unit configured to sense whether the front cover is in an open state or the closed state, wherein in a case where the open/close sensing unit is sensing that the front cover is in the open state, the fault sensing unit is excluded from performing the first fault sensing process irrespective of whether the condition sensing unit is sensing the possibility as being present or not.

4. The image forming apparatus according to claim 1, wherein the condition sensing unit senses the possibility as being present in a case of sensing that a user is present in front of the front cover.

5. The image forming apparatus according to claim 1, wherein the condition sensing unit senses the possibility as being present in a time slot in which there is a possibility that a user is present in front of the front cover based on a timer or an illuminance of an environment in which the image forming apparatus is installed.

6. The image forming apparatus according to claim 1, wherein while the image forming unit is operating, the fault sensing unit performs the first fault sensing process irrespective of whether the condition sensing unit is sensing the possibility as being present or not.

7. The image forming apparatus according to claim 1, wherein in a case of sensing a fault of the actuator, the fault sensing unit reports the fault to an external entity of the image forming apparatus.

8. The image forming apparatus according to claim 1, wherein in a case of failing to perform the first fault sensing process even once in a predetermined period of time, the fault sensing unit reports a failure to perform the first fault sensing process to an external entity of the image forming apparatus.

9. A fault sensing method for an image forming apparatus, the image forming apparatus including an image forming unit configured to form an image, a toner bottle housing configured to house a toner bottle in a withdrawably insertable manner, the toner bottle being filled with a toner used by the image forming unit to form an image, a bottle cover situated such that the bottle cover can open or close an insertion opening of the toner bottle housing, a locking mechanism configured to lock the bottle cover being in a closed state in which the bottle cover is at a position to cover the insertion opening, an actuating mechanism including an unlocking member configured to unlock the bottle cover, being in a locked state, to bring the bottle cover into an open state in which the bottle cover does not cover the insertion opening, and an actuator configured to actuate the unlocking member, and a front cover situated in an openable/closable manner in front of the bottle cover and configured to inhibit the bottle cover from becoming open while the front cover is in a closed state, the fault sensing method comprising:

performing a first fault sensing process in which the actuator is sensed as having a fault in a case where the actuator fails to actuate the unlocking member in spite of the actuator being driven while the image forming unit is non-operating; and sensing presence of a possibility that the front cover is going to be opened, wherein the first fault sensing process is excluded from being performed while the possibility is sensed as being present in the sensing of presence of the possibility.

10. The fault sensing method according to claim 9, further comprising:

performing a second fault sensing process irrespective of whether the possibility is sensed as being present or not in the sensing of presence of the possibility, the second fault sensing process being a process in which the unlocking member is sensed as having a fault in a case where an operating state of the unlocking member while the unlocking member is being unactuated by the actuator represents anything other than a state of being unactuated by the actuator.

11. The fault sensing method according to claim 9, wherein the image forming apparatus further includes an open/close sensing unit configured to sense whether the front cover is in an open state or the closed state, wherein in a case where the open/close sensing unit is sensing that the front cover is in the open state, the first fault sensing process is excluded from being performed irrespective of whether the possibility is sensed as being present or not in the sensing of presence of the possibility.

12. The fault sensing method according to claim 9, wherein in the sensing of presence of the possibility, the possibility is sensed as being present in a case of sensing that a user is present in front of the front cover.

13. The fault sensing method according to claim 9,
wherein in the sensing of presence of the possibility, the possibility is sensed as being present in a time slot in which there is a possibility that a user is present in front of the front cover based on a timer or an illuminance of an environment in which the image forming apparatus is installed.

14. The fault sensing method according to claim 9,
wherein while the image forming unit is operating, the first fault sensing process is performed irrespective of whether the possibility is sensed as being present or not in the sensing of presence of the possibility.

15. The fault sensing method according to claim 9,
wherein in a case of sensing a fault of the actuator in the first fault sensing process, the fault is reported to an external entity of the image forming apparatus.

16. The fault sensing method according to claim 9,
wherein in a case of failing to perform the first fault sensing process even once in a predetermined period of time, a failure to perform the first fault sensing process is reported to an external entity of the image forming apparatus.

17. A non-transitory computer-readable recording medium storing a fault sensing program for an image forming apparatus, the image forming apparatus including
an image forming unit configured to form an image,
a toner bottle housing configured to house a toner bottle in a withdrawably insertable manner, the toner bottle being filled with a toner used by the image forming unit to form an image,
a bottle cover situated such that the bottle cover can open or close an insertion opening of the toner bottle housing,
a locking mechanism configured to lock the bottle cover being in a closed state in which the bottle cover is at a position to cover the insertion opening,
an actuating mechanism including an unlocking member configured to unlock the bottle cover being, in a locked state, to bring the bottle cover into an open state in which the bottle cover does not cover the insertion opening, and an actuator configured to actuate the unlocking member, and
a front cover situated in an openable/closable manner in front of the bottle cover and configured to inhibit the bottle cover from becoming open while the front cover is in a closed state,
wherein when executed by a computer, the fault sensing program causes the computer to:
perform a first fault sensing process in which the actuator is sensed as having a fault in a case where the actuator fails to actuate the unlocking member in spite of the actuator being driven while the image forming unit is non-operating; and
sense presence of a possibility that the front cover is going to be opened,
wherein the first fault sensing process is excluded from being performed while the possibility is sensed as being present in the sensing of presence of the possibility.

* * * * *